United States Patent [19]

Saich

[11] 4,028,695

[45] June 7, 1977

[54] DATA TERMINALS HAVING INTERACTIVE KEYBOARDS AND DISPLAYS AND DATA PROCESSING APPARATUS INCORPORATING SUCH TERMINALS

[75] Inventor: William George Saich, Camberley, England

[73] Assignee: The Solartron Electronic Group Limited, Farnborough, England

[22] Filed: July 11, 1974

[21] Appl. No.: 487,687

[30] Foreign Application Priority Data

July 14, 1973 United Kingdom ............ 33643/73

[52] U.S. Cl. ...................... 340/365 R; 340/324 A; 35/6
[51] Int. Cl.² .......................................... G06F 3/14
[58] Field of Search .... 340/365 R, 365 C, 324 AD; 35/6; 197/98

[56] References Cited

UNITED STATES PATENTS

| | | | |
|---|---|---|---|
| 1,984,599 | 12/1934 | Safar | 35/6 |
| 3,187,321 | 6/1965 | Kameny | 340/365 R |
| 3,220,000 | 11/1965 | Lesage | 340/365 R |
| 3,480,945 | 11/1969 | Nelson | 340/365 R |
| 3,500,327 | 3/1970 | Belcher et al. | 340/324 AD |
| 3,609,743 | 9/1971 | Lasoff et al. | 340/324 AD |
| 3,670,322 | 6/1972 | Mallebrein | 340/365 C |
| 3,815,127 | 6/1974 | Blumke | 340/365 C |

Primary Examiner—Marshall M. Curtis
Attorney, Agent, or Firm—William R. Sherman; Kevin McMahon

[57] ABSTRACT

The data terminal is manually operable and is intended for communicating with a data processor. The terminal has a keyboard having a plurality of manually selectable keys, each of which represents a respective message to be communicated to the processor. A display is provided having a plurality of zones each corresponding to a respective key of the keyboard, and the display is arranged to display in each zone an indication of the message represented by the key corresponding to that zone. The keys are in the form of touch keys. Merely touching a key serves to manually select that key, and causes the visual appearance of the display to change, so as to indicate which key is selected. This change may for example be a reversal of the relative brightness of the corresponding zone of the display e.g. dark on light instead of light on dark. Actually depressing the key, as opposed to just touching it, produces an output signal for communicating the message represented by the selected key to the processor.

20 Claims, 3 Drawing Figures

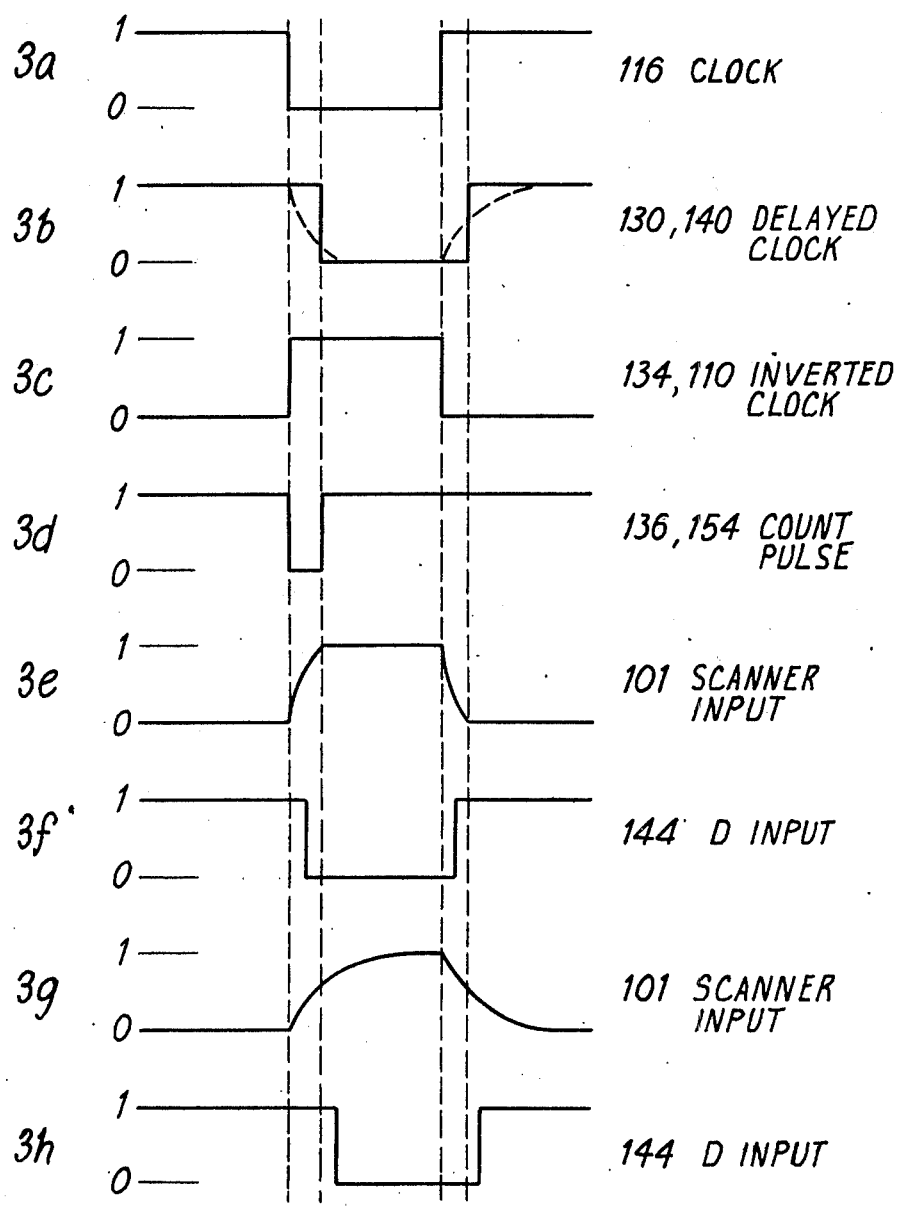

DATA TERMINALS HAVING INTERACTIVE KEYBOARDS AND DISPLAYS AND DATA PROCESSING APPARATUS INCORPORATING SUCH TERMINALS

This invention relates to manually-operable data terminals for communicating with data processors, and to data processing apparatus incorporating such terminals.

One known type of data terminal comprises a keyboard for composing messages to be communicated to the processor, and a video display unit whereby these messages and/or messages from the computer may be displayed. In order to achieve a reasonable speed of operation, it is desirable that the user should be able to operate the keyboard while simultaneously monitoring the messages displayed by the display unit, which requires the user to have a degree of manual dexterity comparable to that required for touch typing. It is an object of the present invention in its broadest aspect to provide a data terminal of this type, in which such simultaneous operation of the keyboard and monitoring of the display unit by a relatively unskilled user is facilitated.

In this type of data terminal, the keyboard may be of the kind having at least some keys which each represent a whole message. Such keys greatly simplify the user's task, but at the expense of flexibility in use, since the whole messages cannot then readily be changed or increased in number. It is another object of the present invention, in one of its preferred embodiments, to alleviate this problem.

According to the present invention in its broadest aspect, there is provided a manually-operable data terminal for communicating with a data processor, the terminal comprising:

a keyboard having a plurality of manually-selectable keys each of which represents a respective message or part of a message to be communicated to the processor;

display means having a plurality of zones each corresponding to a respective key of the keyboard, the display means being arranged to display in each zone an indication of the message or part of a message represented by the key corresponding to that zone;

control means responsive to manual selection of each key to change the visual appearance of the display produced by the display means so as to indicate which key is selected; and means operable when a desired key has been selected to produce an output signal for communicating the message or part of a message represented by the selected key to the processor.

Thus the user can select a desired key while looking at the display means, his selection being verified by the change in the visual appearance of the display produced by the display means. Having selected the desired key, the user then operates the output signal producing means to produce an output signal representative of the message or part of a message represented by the selected key. In this specification, it is to be understood that the expressions "message" and "part of a message" include a single alphanumeric character, symbol or the like to be communicated to the processor for, inter alia, storage therein, or replacing or modifying information stored therein, or instructing the processor to perform an operation such reading out information stored therein.

In a preferred embodiment of the invention, the respective messages or parts of messages represented by at least some of the keys are changeable, the display means being arranged to display in each zone an indication of the message or part of a message currently represented by the key corresponding to that zone and the output signal producing means being arranged to produce an output signal for communicating the message or part of a message currently represented by the selected key.

The invention also comprises a data processing apparatus comprising a data processor and a data terminal in accordance with any of the preceding statements of invention for communicating with the processor.

According to another aspect of the present invention there is provided data processing apparatus comprising:

a data processor;

data storage means for storing a plurality of groups of messages or parts of a message capable of being received by the processor;

selection means for selecting from the storage means respective ones of said groups of messages or parts of a message; and a data terminal for communicating with the processor, the terminal comprising a keyboard having a plurality of manually-selectable keys, respective ones of which represent respective ones of the messages or parts of a message within the group currently selected by the selection means, display means having a plurality of zones each corresponding to a respective key of the keyboard, the display means being arranged to display in each zone an indication of the message or part of a message currently represented by the key corresponding to that zone, control means responsive to manual selection of each key to change the visual appearance of the display produced by the display means so as to indicate which key is selected, and means operable when a desired key has been selected to produce an output signal for communicating the message or part of a message currently represented by the selected key to the processor.

The selection means may be responsive to said output signal to change the group of messages or parts of a message selected by the selection means.

Preferably the zones of the display means are disposed in a similar format to that of the respective keys which they represent.

Conveniently the keys are touch keys, touching of a key serving to manually select the key. In this case, there may be provided scanning means for sequentially addressing the keys and means for stopping the scanning means when it addresses a touched key, whereby the address in the scanning means when it is stopped identifies the touched key.

The output signal producing means may comprise switch means arranged to be operated by pressing any touched key.

Advantageously, the control means is arranged to change the visual appearance of the display produced by the display means by changing the visual appearance of the zone corresponding to the selected key, for example by reversing the relative brightness of the background of the zone and the indication of the message or part of a message in the zone. Thus the display means may comprise a cathode ray tube on whose face the zones are disposed, raster scanning means for scanning the electron beam over the face of the cathode ray tube, and a read-only memory responsive to respective address signals for controlling the intensity of the electron beam to generate images of respective alphanumeric characters, symbols or the like in the zones. In this case, the message or part of a message represented by a key may be changed by changing the address signals applied to the read only memory, e.g., under the control of the processor.

The invention will now be described, by way of non-limitative example only, with reference to the accompanying drawings, of which:

Figure 1:
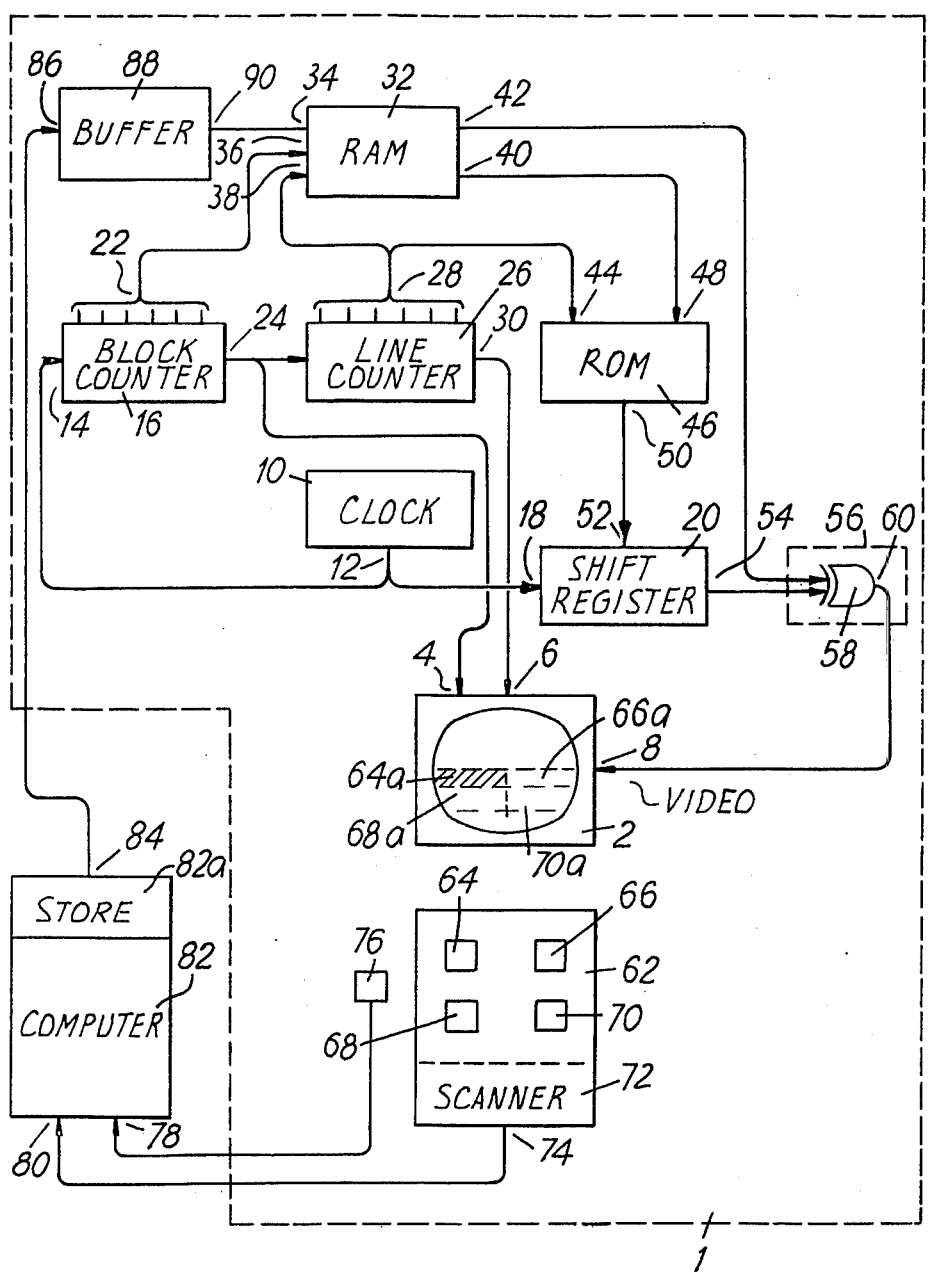
FIG. 1 is a block diagram of a data terminal in accordance with the present invention, shown connected to a data processor to form data processing apparatus also in accordance with the present invention.
Figure 2:
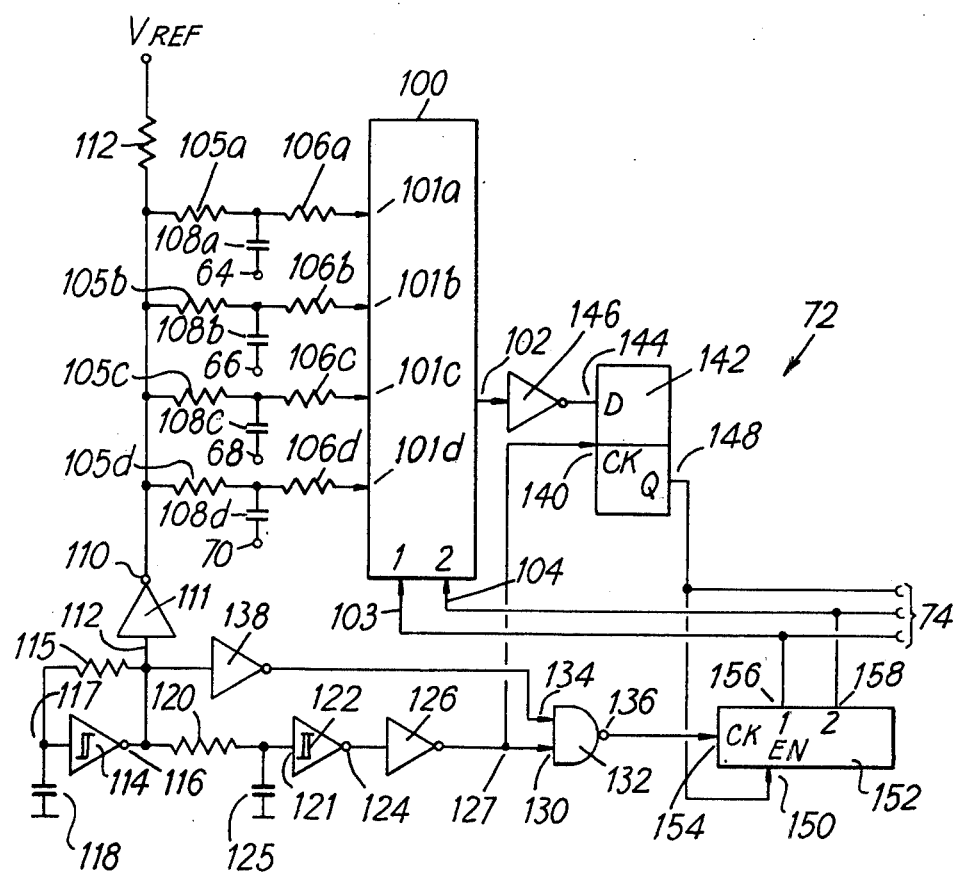
FIG. 2 is a schematic circuit diagram of a keyboard forming part of the terminal of FIG. 1.

FIG. 3 is an explanatory diagram showing the signal waveform appearing at various points in the circuit of FIG. 2; and The data terminal shown in FIG. 1 is indicated generally at 1 and comprises a visual display unit (VDU) 2 having a screen for displaying information and a keyboard 62, both connected to communicate with a data processor constituted by a digital computer 82 having a store 82a. The keyboard 62 has a plurality of keys, typically 64, arranged in a predetermined format, only four of the keys, indicated at 64, 66, 68 and 70, being shown in FIG. 1 for the sake of simplicity. The respective functions of the keys 64, 66, 68, 70, that is the respective messages or parts of a message represented thereby, are changeable under the control of the computer 82 as will hereinafter become apparent, and the respective current functions of each of the keys 64, 66, 68, 70 are displayed in respective zones 64a, 66a, 68a, 70a on the lower part of the screen of the VDU 2, the zones 64a, 66a, 68a, 70a being disposed in a similar format to that of the keys 64, 66, 68, 70.

As will be described in more detail hereinafter, the keys 64, 66, 68, 70 in the keyboard 62 are arranged to respond selectively to touch and to a positive pressure. When a key is touched the corresponding zone within the format on the screen is designated visually by changing the appearance of the zone in relation to the rest of the screen, so that the user may verify his selection of a required one of the functions displayed on the screen (i.e. that he is touching the required key) without actually implementing the function. A positive pressure on the key then depresses the key, thereby operating a switch which implements the function selected; typically this will have the additional effect of presenting to the user a further set of control functions displayed within the same format and which may similarly be selected by actuation of the keys. The VDU 2 may simultaneously be used to display supplementary information outside the format on the screen, e.g. in the upper half of the screen, as well as the functions currently available from the keys. The information on the screen is drawn from the store 82a of the computer 82, which is programmed to respond to touch or pressure on the keys of the keyboard.

The VDU 2 of FIG. 1 is typically of the cathode ray tube type and is adapted to provide a raster scan of its electron beam over the face of the cathode ray tube. To this end, the VDU 2 has a line synchronisation input 4, a frame synchronisation input 6 and a video signal input 8.

A clock pulse generator 10 generates pulses at a rate corresponding to that of picture elements in the VDU 2. The output 12 of the generator 10 is connected to the input 14 of a block counter 16 and to the shift input 18 of a shift register 20. The block counter 16 provides at an output 22 thereof a signal representative of the count accrued and, after a predetermined count, further provides at another output 24 thereof a signal which is applied to the input of a line counter 26. The line counter 26 similarly provides at an output 28 thereof a signal representative of count accrued therein and a further output signal at its output 30 after a predetermined count. The signals at outputs 24 and 30 are respectively applied to the inputs 4 and 6 of the VDU 2 to provide line and frame synchronisation signals, and it will be appreciated that counters 16 and 26 are additionally required to accommodate time intervals at the end of line and frame scans. The signals at outputs 22 and 28 are representative of the cartesian co-ordinates of scan at any moment.

A random access memory (RAM) 32 provides storage for 1024 8-bit words, and has an input 34 for receiving words to be displayed and inputs 36 and 38 connected respectively to counter outputs 22 and 28 for receiving addresses of words which are to be read out of the RAM 32. Words read out of the RAM 32 comprise character information, which appears at an output 40 of the RAM 32 and which may for example be in 6-bit ASCII code, and a further bit at output 42 which determines whether the character is to be displayed light on a dark background or dark against a light background.

The output 28 of line counter 26 is connected to an input 44 of a read only memory (ROM) 46. The ROM 46 has a second input 48 connected to the character output 40 of the RAM 32 and an output 50. The ROM 46 may conveniently be a static character generator such as type MM5240AA manufactured by the National Semi-Conductor Corporation of California, and its function is to store at 5 × 7 matrices video information describing the alphanumeric characters defined in ASCII code.

The output 50 of the ROM 46 is connected to the input 52 of the shift register 20 so that the video information from the ROM 46, appearing as a 5-bit word, may be loaded into the shift register 20 and then shifted out by application of clock pulses from the clock pulse generator 10 to input 18. The output 54 of the shift register 20 and the output 42 of the RAM 32 are connected to respective inputs of the display control 56, which comprises an exclusive OR gate 58 having an output 60 which is connected to the video input terminal 8 of the VDU 2.

Conveniently adjacent to the VDU 2 is the keyboard 62, which is shown as having four touch keys constituting the keys 64, 66, 68 and 70 respectively and corresponding to the zones 64a, 66a, 68a and 70a respectively on the screen of the VDU 2. The keyboard 62 also comprises a scanner 72 which continuously and sequentially scans the touch keys 64, 66, 68 and 70 and provides at an output 74 thereof signals representative of any single key which is touched. Also conveniently located near the keyboard 62 and the VDU 2 is a switch 76 which, together with the output 74, is connected to respective inputs 78 and 80 of the computer 82, whose store 82a is adapted to store digital words representative of alphanumeric characters, symbols and the like. The computer 82 has an output channel 84 which is connected to the input 86 of a buffer 88 which has an output 90 connected to the input 34 of RAM 32.

Timing signals governing the transfer of digital words between the computer 82 and the buffer 88 and between these and other units of FIG. 1 are provided by a master control unit which, in the interests of clarity, is not shown but which operates according to principles well known to those skilled in the art.

FIG. 2 shows in greater detail the touch keys 64, 66, 68 and 70 and the scanner 72. These are shown diagrammatically in FIG. 1 and it will be appreciated that although only four touch keys are shown in FIGS. 1 and 2, there would typically be a matrix of 64 touch keys arranged, for example, in eight columns of eight keys. Just as each of the four touch keys of FIG. 1 corresponds to one of the four zones 64a, 66a, 68a, 70a of the display on the VDU 2, so each of the 64 touch keys would correspond to a respective one zone of 64 zones on the screen of the VDU 2, these sixty four zones beong arranged in the same format as the sixty four keys (i.e. eight columns of eight zones).

Referring to FIG. 2, the scanner 72 comprises a multiplexing switch 100 having four inputs 101a, 101b, 101c and 101d, an output 102 and two address inputs 103 and 104. A signal path may be established between any one input 101 and the output 102 by application of the appropriate one of four different coded signals at the address inputs 103 and 104. Two resistors 105a and 106a are connected in series between the input 101a and the output 110 of a driver 111. The output 110 is also connected through a resistor 112 to a source of reference potential $V_{ref}$.

The touch key 64 is connected via a capacitor 108a to the junction point of resistors 105a and 106a. Inputs 101b, 101c and 101d are similarly connected via series resistor pairs 105b and 106b, 105c and 106c, 105d and 106d to the output of the driver 111, with associated capacitors 108b, 108c and 108d and the touch keys 66, 68, 70.

The driver 110 receives pulses at its input 112 from a pulse generator comprising a trigger circuit 114 having a resistor 115 connected between its output 116 and its input 117, and a capacitor 118 between its input 117 and ground.

The output 116 of the pulse generator is connected via resistor 120 to the input 121 of trigger 122 which has an output 124. A capacitor 125 is connected between the input 121 and ground. The output 124 is connected via an inverter 126 to one input 130 of a two input NOR gate 132 which has a second input 134 and an output 136. The second input 134 receives pulses via an inverter 138 from the output 116 of the pulse generator.

The output 127 of inverter 126 is also connected to the clock input 140 of a clocked flip flop 142. This clocked flip flop is an electronic bistable circuit having, in addition to the clock input 140, a signal input 144 and a signal output 148; in operation, the logic level at the signal input 144 at the instant when the logic signal at the clock input changes from a logic level 0 to logic level 1 is transmitted to the signal output 148. The output 102 of the multiplexer 100 is connected via an inverter 146 to the signal input 144, while the signal output 148 is connected to the 'enable' input 150 of a 4-bit counter 152. The counter 152 has a clock input 154 connected to receive pulses from the output 136 of the NOR gate 132, and provides an output signal representative of the accumulated count therein at outputs 156 and 158, which are connected respectively to the address inputs 103 and 104 of the multiplexer 100.

The output 74 shown in FIG. 1 comprises outputs 156 and 158, together with a signal from the output 148 of flip flop 142 indicative of one of the states thereof.

The broad principle of operation of the touch keyboard and scanner circuit of FIG. 2 is that the pulses produced at the output 116 of the pulses generator are counted by the counter 152, the output of which advances multiplexing switch 100 from one input 101 to the next until one of the keys 64, 66, 68, 70 is touched; when next the multiplexing switch 100 connects the input 101 corresponding to the touched key to its output 102, the enabling signal from the flip flop 142 to the counter 152 will be removed, and the multiplexing switch will stop at the touched key. The output address of the counter 152 (i.e. the count therein) then designates the key touched.

The detailed operation of the circuits of FIG. 2 is illustrated by reference to FIG. 3, which shows wave forms at various points of the circuit of FIG. 2.

FIG. 3a shows a pulse at the output 116 of the pulse generator 114. The pulse is delayed by the combination of the resistor 120 and capacitor 125, which together constitute a low pass filter, and the delayed pulse, which appears at the inputs 130 and 140, is shown in FIG. 3b.

FIG. 3c shows the pulse of FIG. 3a, after inversion by the inverters 111 and 138 respectively as its appears at points 110 and 134, while FIG. 3d shows the pulse at the output 136 of the NOR gate 132 marking the coincidence of logic state 1 at the inputs 130 and 134 of the NOR gate 32.

FIGS. 3e and 3f show the respective waveforms at the inputs 101 of the scanner 100 and the input 144 of the flip flop 142 respectively when the touch key corresponding to the input 101 of the scanner 100 is not loaded by the additional capacity of a human digit; FIGS. 3g and 3h respectively show the corresponding waveforms when the touch key is touched. It will be seen that the trailing edge of the pulse at the signal input 144 has been delayed; in FIG. 3f it is shown rising before the trailing edge of the pulse on the clock input 140 in FIG. 3b, but in FIG. 3h it occurs after the delayed clock input.

As a result, the output 148 remains at logic level 1, thus enabling the counter 152, only when the switch is not touched. Resetting of the flip flop 142, denoting that a key has been touched, stops the counter 152, freezing the count therein, and additionally serves as an interrupt signal to computer 82 which 'reads' in the address 74 corresponding to the key touched.

In operation, the format of the display on the VDU 2 is determined by the RAM 32, the clock 10, the counters 16 and 26, the ROM 46, and the shift register 20. The designation of characters within the format is determined by the words, each corresponding to a character within the format, loaded into RAM 32 from the store 82a of the computer 82 via the buffer 88.

The function of the RAM 32 is thus to provide a buffer holding all the characters to be displayed together with information specific to the display of each character e.g. whether the character is to be displayed dark on a light background or light on a dark background.

The RAM 32 is initially loaded with words from the computer 82 via the buffer 88, these words defining the characters to be displayed in 6-bit ASCII code. The contents of the RAM 32 are then read out line by line into the ROM 46. Each character on the VDU 2 is built up during 7 lines of scan, each line of the character comprising five picture elements. Each character must therefore be presented to the ROM 46 seven times; each time it is presented the ROM 46 receives a different line address from the output 28 of the line counter 26 and provides the corresponding 5-bit signal to the shift register 20. This 5-bit word is shifted out serially by clock pulses from clock 10 and constitutes the video signal of 5 picture elements defining a specific line of the character.

Thus a complete line of the display on the VDU 2 is built up by reading out consecutively from the RAM 32 into the ROM 46 the characters traversed by the line; the line address is defined by the signal at the output 28 and the corresponding video signal appears at the output 54 of the shift register 20. The master control unit mentioned hereinbefore provides timing signals to govern the transfer of words from RAM 32 to ROM 46 and hence the spacing between characters.

When a character is read out from the RAM 32 into the ROM 46, a bit in the output register is set if the character is to appear on the display as dark on a light background instead of light on a dark background, i.e. whether the video signal is to be inverted. A corresponding bit in the store 82a of the computer 82 is set if a key in the keyboard is touched and the address of the key has been accepted by the computer 82. The computer 82 then sets the corresponding bits in RAM 32.

The exclusive OR gate 58 provides at its output 60 a logic level 1 signal only if one input is at logic level 1 and the other at logic level 0; it functions therefore to invert the video between input from output 54 and output 60 if the input from 42 is set at logic 1.

The function of keyboard 62 is to allow the user to designate any predetermined zone on the display of VDU 2. Each touch key such as 64 corresponds to a zone on the screen and it is arranged when the user touches a key, the video signal to the corresponding zone on the screen is inverted, as illustrated at 64a, thereby allowing the user to verify visually his selection of the key corresponding to the zone he wishes to designate. The user may then operate the switch 76 to provide a signal to computer 82; this combination with designation of a zone on the display, constitutes the selected message to the computer. Typically the switch 76 is disposed beneath the touch key panel of the keyboard 62, so that additional pressure on any touch key operates the switch.

It will be appreciated that this technique allows the keyboard to serve as an alphanumeric keyboard if alphanumeric characters are displayed on the VDU; indeed, the keyboard may, if desired, have its keys arranged in the same format as a standard typewriter or teleprinter keyboard. However, the keyboard may also serve as a functional keyboard for selection of defined whole computer messages (or parts of messages), each of which is displayed in a predetermined zone on the VDU 2 by suitable programming of the computer.

The computer 82 is programmed so that the format of the display and any supplementary information to be displayed in read into RAM 32 before any use is made of the system. This data, which is substantially fixed, is referred to as background information.

The specific data to be written within the format to define the function of the set of keys at any moment is referred to as 'foreground data'. A group or set of foreground data corresponding to each set of functions within the format is referred to as a 'page'. Operation of the keyboard to bring forward a new set of functions on this display may be likened to 'turning a page'.

The computer may be used primarily as a data store, in which case the function of the keys is to select progressively more detailed information from the store for display on the screen.

Alternatively the computer may be used for computation or control, in which case the function of the keys may be to modify the execution of the programme, for example by changing values of a parameter used in the programme.

Typically, the computer will combine the roles of data store and computation and the keyboard will be used in both capacities.

When a key is touched, the scanner 72 stops with the address of the key touched in the counter 152 and with flip flop 142 reset. The computer 82 is provided with a hardware interrupt facility (not shown) which responds to a signal from the scanner 72, indicative of the flip flop 142 being reset, by digressing from the main programme currently being executed into a special input programme which stores in the store 82a within the computer the designation of the key touched, i.e. the address in counter 152. When this has been done the input programme releases control and the main programme is resumed from the point where it was left. At a convenient time shortly thereafter, for example during the next iteration in the case of an iterative programme, the computer main programme will enter a routine the effect of which is to invert that part of the video to VDU 2 which corresponds to the key touched. This is done by referring the key address directly to the store locations in RAM 32 which contain the words representing the characters displayed in the zone, reading these characters and re-writing the characters in the same locations of RAM 32 with the video bit in each word set negative.

It will be appreciated that if desired the video inversion can be effected by the direct application of the signal at the output 74 of the scanner 12 to the RAM 32, without the intervention of the computer 82.

If a key is pressed, rather than just touched, the computer programme refers during the next iteration to the block of the computer store corresponding to the data currently displayed and, using the address of the key pressed, to the zone defining the function allocated to that key.

This then constitutes the function to be executed by the programme and will be typically in the form of a 'jump' instruction which enters a new sub-programme directed to implement the function currently assigned to the key.

For example, if a new page is required, the programme will cause a new set of words, corresponding to the foreground information in the new page, to be transferred successively, via the computer output channel 84 and buffer 88, to the RAM 32, replacing the corresponding words stored there.

If the keyboard is to be used to enter a new parameter into the computer programme, e.g. thus the three figure number 456, the format on the display will show in respective zones of the display the parameter to be modified, the numbers 0–9 and the instruction 'execute'. The user will touch, verify, and then press successively the keys designated 4, 5 and 6 which will appear following the designated parameter on the display. When the number 456 has been entered and displayed, the user will press the 'execute' key to enter the new value, 456, of the parameter. Simultaneously a page will be turned so that the new data displayed is of a general nature from which the operator may again selectively draw detail or modify, as already described.

Thus for example the computer may contain detailed information concerning a number of simulated aircraft in a zone under radar surveillance, the computer forming part of a simulator for training air traffic controllers. Each of the simulator aircraft is under the control of a "pilot" (actually the instructor who is training the controllers), each "pilot" controlling several simulator aircraft. Each trainee air traffic controller is presented with a simulated plan position display showing numbers of aircraft and is able to communicate with each "pilot" by means of a simulator R/T link.

It is desirable that each "pilot" should have access to all the data stored in the computer pertaining to the simulated aircraft under his control but if he is controlling six aircraft it may be impracticable to display all the data relating to each aircraft on the screen simultaneously. Furthermore it is desirable that he should be able to exercise the same control over the movements of each simulator aircraft as would a pilot in real life. On the other hand the control of these simulated aircraft must be made as simple as possible to allow the use of part-time and untrained staff for this part of the operation of a training simulator.

Accordingly it is provided that not all the information is presented on the screen of the VDU 2 simultaneously, but that specific information and progressively more detailed information may be brought up at the request of the "pilot". The same controls which are used for bringing forward this information, the touch switches 64, 66, 68 and 70 on the keyboard 62, can be used in conjunction with the switch 76 to bring forward the information and to control the aircraft.

Thus the computer programme may be adapted so that initially the screen of VDU 2 shows only the flight numbers of, say, four aircraft. When the "pilot" touches touch switch 64 the scanner 72 provides an output 74 at input 80 of computer 82 to indicate that touch switch 64 has been touched. The computer 82 is programmed to respond to this signal by providing an output on its channel 84 which is transferred via the buffer 88 to set the appropriate bit in each of the characters in RAM 32 which are to be displayed in the zone 64a on the screen of the VDU 2 corresponding to touch switch 64.

The effect so far as the "pilot" is concerned is that whilst the characters in the other three zones on the screen of the VDU2 are shown light against dark background, those in the zone 64a corresponding to touch switch 64 are shown dark against a light background. He may thereby verify without looking down at the keyboard that he has touched the intended switch. Although this may not appear very significant when only four switches are concerned, it is of benefit in avoiding mistakes when a larger number of switches, such as the eight-by-eight matrix referred to earlier, are employed.

When the "pilot" has verified visually that he has selected the correct flight number he will then operate switch 76.

The computer programme is then adapted to bring forward further information related to the flight number formerly designated in the selected zone (i.e. top left hand quadrant); instead of the four flight numbers shown on the first display there will now be displayed, for example, the speed, heading, height and destination of the selected flight number. If the "pilot" then wishes to change the speed of the selected aircraft he will follow the same procedure again: touch the key corresponding to the zone on the screen of the VDU2 containing the speed, verify visually his selection, press switch 76, whereupon the computer 82 will respond by providing on its output channel 84 a selection of four speeds which are then transferred by a buffer 88 to RAM 32 and displayed in the four zones on the screen of the VDU2.

Finally the "pilot" makes his selection of one of the four speeds by pressing the appropriate touch key followed by switch 76, whereupon the computer 82 accepts the new speed required for the selected aircraft and proceeds to calculate the appropriate acceleration and modifications to the flight plan. Meanwhile, having executed an instruction to change the programme rather than to the display, the computer now restores to the screen of VDU2 the four flight numbers originally displayed to allow the operator to initiate another sequence of display information or control.

It will be appreciated that many modifications can be made to the described embodiment of the invention. For example, instead of inverting the video in the zone of the screen of the VDU2 to indicate that the key corresponding to that zone is touched, this indication can be provided by blanking or otherwise modifying the visual appearance of all the other zones corresponding to untouched keys. Additionally, when the function represented by a touched key is executed by operating the switch 76, and this function results in the 'turning a page' referred to hereinbefore, i.e. changing the functions of the keys and displaying the new functions in the appropriate zones on the screen of the VDU2, it will be appreciated that not all the keys necessarily have their respective functions changed: indeed, when there is a large number of keys, some of the keys which were originally assigned a functions may have no functions after the change of vice versa. It is to be understood that in this specification the expressions "changing the message or part of a message represented by a key" and "changing the function of a key" include rendering a key formerly representative of a message or function no longer representative or any message or function, and vice versa.

What we claim is:

1. A manually-operable data terminal for enabling an operator to communicate with a data processor, the terminal comprising:
   a keyboard having a plurality of manually-selectable keys each key including means responsive to such selection to produce a signal representative of a respective message or part of a message to be communicated to the processor;
   variable format display means separate from the keyboard having a plurality of zones each corresponding to a respective key of the keyboard, the display means being arranged to display in each zone an indication of the message or part of a message represented by the key corresponding to that zone;

control means responsive to said selection responsive means to change the visual appearance of the display produced by the display means so as to indicate which key is selected; and means selectably operable by the operator when a desired key has been selected to produce an output signal for communicating the message or part of a message represented by the selected key to the processor.

2. A terminal as claimed in claim 1, wherein said output signal producing means is manually operable.

3. A terminal as claimed in claim 1, wherein the respective messages or parts of messages represented by at least some of the keys are changeable, the display means being arranged to display in each zone an indication of the message or part of a message currently represented by the key corresponding to that zone and the output signal producing means being arranged to produce an output signal for communicating the message or part of a message currently represented by the selected key.

4. A terminal as claimed in claim 2, wherein the zones of the display means are disposed in a similar format to that of the respective keys which they represent.

5. A terminal as claimed in claim 2, wherein the keys are touch keys, touching of a key serving to manually select the key.

6. A terminal as claimed in claim 5, wherein there is provided scanning means for sequentially addressing the keys and means for stopping the scanning means when it addresses a touched key, whereby the address in the scanning means when it is stopped identifies the touched key.

7. A terminal as claimed in claim 5, wherein the output signal producing means comprises switch means arranged to be operated by pressing any touched key.

8. A terminal as claimed in claim 2, wherein the control means is arranged to change the visual appearance of the display produced by the display means by changing the visual appearance of the zone corresponding to the selected key.

9. A terminal as claimed in claim 8, wherein the control means is arranged to reverse the relative brightness of the background of the zone and the indication of the message or part of a message in the zone.

10. A terminal as claimed in claim 2, wherein the display means comprises a cathode ray tube on whose face the zones are disposed, raster scanning means for scanning the electron beam over the face of the cathode ray tube, and a read-only memory responsive to respective address signals for controlling the intensity of the electron beam to generate images of respective alphanumeric characters, symbols or the like in the zones.

11. Data processing apparatus comprising:
a data processor;
data storage means for storing a plurality of groups of messages or parts of a message capable of being received by the procesor;
selection means for selecting from the storage means respective ones of said groups of messages or parts of a message; and
a data terminal for communicating with the processor, the terminal comprising a keyboard having a plurality of manually-selectable keys, each key including means responsive to such manual selection to produce a signal, at least some of said signals being representative of respective ones of the messages or parts of a message within the group currently selected by the selection means, display means separate from the keyboard having a plurality of zones each corresponding to a respective key of the keyboard, the display means including means for displaying in each zone an indication of the message or part of a message currently represented by the key corresponding to that zone, control means responsive to said manual selection responsive means to change the visual appearance of the display produced by the display means so as to indicate which key has been selected and means selectably operable by the operator when a desired key has been selected to produce an output signal for communicating the message or part of a message currently represented by the selected key to the processor.

12. Data processing apparatus as claimed in claim 11, wherein selection means are responsive to said output signal to change the group of messages or parts of a message selected by the selection means.

13. Data processing apparatus as claimed in claim 11, wherein said output signal producing means are manually operable.

14. A terminal as claimed in claim 1 in combination with a data processor, said terminal including means for communicating with said data processor.

15. A keyboard module for use in a manually operable data terminal for allowing an operator to communicate with a data processor, comprising:
a keyboard having a plurality of manually randomly selectable keys, each key including means responsive to such manual selection to produce a signal representative of a respective message or part of a message to be communicated to the processor;
circuit means responsive to said selection responsive means for producing a first output signal indicative of which key is selected and suitable for verifying that a desired key has been correctly selected; and
switch means, operable by manual depression of any selected key, for producing a second output signal suitable for enabling the respective message or part of a message represented by the selected key to be communicated to the processor.

16. A keyboard module as claimed in claim 15, wherein the keys are touch keys, touching of a key serving to manually select the key.

17. A keyboard module as claimed in claim 16, wherein the switch means comprises a switch device, the keyboard being movable with respect to the switch device such that pressing any selected key causes movement of the keyboard with respect to the switch device so as to operate the switch device.

18. A keyboard module as claimed in claim 16, wherein said circuit means comprises scanning means for sequentially addressing the keys, and means for stopping the scanning means when it addresses a touched key, whereby the address in the scanning means when it is stopped identifies the touched key.

19. A keyboard module as claimed in claim 18, wherein said circuit means further comprises a pulse generator for generating a first train of pulses, a first delay circuit connected to receive and delay the first train of pulses so as to produce a second train of pulses delayed with respect to the first train, said stopping means being connected to receive the second train, and a plurality of second delay circuits each including a respective one of the touch keys, the scanning means comprising a counter for counting the pulses or one of the trains, and a multiplexing switch responsive to the count in the counter for sequentially connecting the stopping means to receive the first train via each one of the second delay circuits in turn, the arrangement being such that the delay produced by each second delay circuit when its respective touch key is not touched is less than that produced by the first delay circuit, but the delay produced by each second delay circuit when its respective touch key is touched is greater than that produced by the first delay circuit, the stopping means being arranged to stop the counter when it receives a pulse of the second train before the corresponding pulse of the first train.

20. A keyboard as claimed in claim 19, wherein said stopping means comprises a clocked flip-flop having a signal input connected to receive the first train via the multiplexing switch and a clock input connected to receive the second train.

* * * * *

UNITED STATES PATENT OFFICE
CERTIFICATE OF CORRECTION

Patent No. 4,028,695　　　　　　　　　Dated June 7, 1977

Inventor(s) William George Saich

It is certified that error appears in the above-identified patent and that said Letters Patent are hereby corrected as shown below:

Column 5, line 21 before "arranged" delete "beong" and substitute therefor -- being --.

Column 7, line 44 after "arranged" insert -- that --.

Column 9, line 52 after "its" insert -- output --.

Column 10, line 54 after "representative" delete "or" and substitute therefor -- of --.

Signed and Sealed this

Twenty-third Day of May 1978

[SEAL]

Attest:

RUTH C. MASON　　　　　　　　LUTRELLE F. PARKER
*Attesting Officer*　　　　*Acting Commissioner of Patents and Trademarks*